United States Patent
Lorencak et al.

(10) Patent No.: US 6,746,542 B1
(45) Date of Patent: Jun. 8, 2004

(54) MODIFYING STARCH WITH CATIONIC POLYMERS AND USE OF THE MODIFIED STARCHES AS DRY-STRENGTH AGENT

(75) Inventors: Primoz Lorencak, Ludwigshafen (DE); Andreas Stange, Mannheim (DE); Kurt Diehl, Freinsheim (DE); Norbert Mahr, Limburgerhof (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/926,230

(22) PCT Filed: Mar. 23, 2000

(86) PCT No.: PCT/EP00/02567
§ 371 (c)(1),
(2), (4) Date: Sep. 27, 2001

(87) PCT Pub. No.: WO00/60167
PCT Pub. Date: Oct. 12, 2000

(30) Foreign Application Priority Data

Apr. 1, 1999 (DE) .......................................... 199 15 157

(51) Int. Cl.$^7$ .......................... C08B 30/12; C08B 30/00; D21H 11/00; C08G 63/48; C08F 116/06
(52) U.S. Cl. ............................. 127/32; 127/67; 127/71; 162/164.6; 162/168.2; 162/175; 525/54.24; 525/54.26
(58) Field of Search .............................. 127/32, 67, 71; 162/164.6, 168.2, 175; 525/54.26, 54.24

(56) References Cited

U.S. PATENT DOCUMENTS

| | | | | |
|---|---|---|---|---|
| 3,467,608 A | | 9/1969 | Dishburger et al. ............. 260/9 |
| 3,674,725 A | * | 7/1972 | Aitken et al. ................... 260/9 |
| 3,854,970 A | | 12/1974 | Aitken ......................... 106/210 |
| 4,097,427 A | * | 6/1978 | Aitken et al. .................. 262/9 |
| 4,146,515 A | * | 3/1979 | Buikema et al. ............... 260/9 |
| 4,880,497 A | | 11/1989 | Pfohl et al. .................. 162/135 |
| 4,940,514 A | * | 7/1990 | Stange et al. .............. 162/168.2 |
| 4,978,427 A | | 12/1990 | Pfohl et al. .............. 162/168.2 |
| 5,851,300 A | * | 12/1998 | Linhart et al. ................ 127/32 |
| 5,859,128 A | | 1/1999 | Moffett ...................... 525/54.2 |
| 6,114,435 A | * | 9/2000 | Nilz et al. .................. 524/548 |
| 6,160,050 A | * | 12/2000 | Niessner et al. ........ 524/54.26 |

FOREIGN PATENT DOCUMENTS

| | | |
|---|---|---|
| DE | 37 19 480 | 2/1988 |
| DE | 197 01 524 | 7/1998 |
| DE | 197 13 755 | 10/1998 |
| EP | 0 282 761 | 9/1988 |
| EP | 0 301 372 | 2/1989 |
| WO | WO 96/13525 | 5/1996 |
| WO | WO 98/31711 | 7/1998 |
| WO | WO 98/45536 | 10/1998 |

OTHER PUBLICATIONS

Research Disclosure, XP 000359905, No. 3347, p. 206, "Improving Fine Particle Retention in Newsprint Formation", Mar. 1, 1993.
Ullmann's Enzyklopaedia de Technischen Chemie, 4$^{th}$ Edition, vol. 17, pp. 581–589, "Papier, Herstellung USW.", 1979 No month available.

\* cited by examiner

*Primary Examiner*—Mark L. Bell
*Assistant Examiner*—Patricia L. Hailey
(74) *Attorney, Agent, or Firm*—Oblon, Spivak, McClelland, Maier & Neustadt, P.C.

(57) ABSTRACT

A process for modifying starch by heating starch in an aqueous medium to temperatures above the gelatinization temperature of said starch comprises effecting said modifying of said starch in the presence of (a) a polymeric cationizer selected from the group consisting of the polymers containing vinylamine units and having molar masses of up to 1 million, the polyethyleneimines, the polydiallyldimethylammonium chlorides, the condensates of dimethylamine with epichlorohydrin or dichloroalkanes, the condensates of dichloroethane and ammonia, and the mixtures thereof, and (b) polymeric papermaking drainage aids selected from the group consisting of the water-soluble crosslinked polyamidoamines with or without an ethyleneimine graft, the polymers containing acrylamide and/or methacrylamide units and having molar masses of more than 1 million, the polymers containing vinylamine units and having molar masses of more then 1 million, and the mixtures thereof.

17 Claims, No Drawings

MODIFYING STARCH WITH CATIONIC POLYMERS AND USE OF THE MODIFIED STARCHES AS DRY-STRENGTH AGENT

BACKGROUND OF THE INVENTION

1. Field of the Invention

The present invention relates to a process for modifying starch by heating starch with at least one cationic polymer in an aqueous medium to temperatures above the gelatinization temperature of said starch, to the modified starches obtainable by said process, and to the use of said modified starches as paper, paperboard and cardboard dry strength enhancer.

2. Description of the Background

Ullmann's Enzyklopädie der Technischen Chemie, 4$^{th}$ edition, Verlag Chemie, Weinheim, 1979, vol. 17, pages 581 ff., gives a general description of the use of digested, water-soluble starches and of water-soluble starch derivatives as assistants for papermaking, in particular for enhancing the strength of paper. However, the retention of the dissolved starches in paper is low, leading to a considerable wastewater loading.

U.S. Pat. No. 3,467,608 describes a process for preparing a cationic starch by heating an aqueous starch slurry in the presence of a polyalkyleneimine, for example polyethyleneimine, or of a polyalkylenepolyamine, for example polyethylenepolyamine. The molecular weight of the modifying polymer used is not less than 50,000 in either case. The reaction mixture contains 0.5 to 40% by weight of the polymer and 60 to 99.5% by weight of starch, the percentages being based on the solids content. The possibility of using starches modified by hydrolysis, oxidation, esterification and etherification is described here in general terms. The resulting cationic starch derivatives are used as flocculants.

U.S. Pat. No. 4,097,427 describes a process for cationizing starch by reacting an aqueous starch slurry under alkaline reaction conditions in the presence of an oxidizing agent with a water-soluble polymer which contains quaternary ammonium groups. Only unmodified or minimally degraded starches are used, preferably maize and tapioca starch. The polymers containing quaternary ammonium groups are selected from polymers containing epichlorohydrin units, quaternized polyethyleneimines, quaternized diallyldialkylamine polymers, etc. The oxidizing agent is for example ammonium persulfate, hydrogen peroxide, sodium hypochlorite, ozone or tert-butyl hydroperoxide. The pH of the starch slurry is adjusted to about 8 using water-soluble bases. The modified cationic starches thus prepared are added to paper stock to enhance the dry strength of the paper being produced. In this process, however, the wastewater has a very high chemical oxygen demand (COD).

U.S. Pat. No. 4,146,515 discloses a process for preparing cationic starch used for surface sizing and coating paper and paper products. In this process, an aqueous slurry of oxidized starch is digested together with a cationic polymer in a continuous cooker. The cationic polymers are selected from the group consisting of epichlbrohydrin-dimethylamine condensate, diallyldimethylanmonium chloride polymer, quaternized ethylene chloride dichloride ammonia reaction product and also quaternized polyethyleneimine, inter alia.

DE-A-3719480 discloses a process for producing paper, paperboard and cardboard by using a dry strength enhancer comprising a mixture obtained by heating native potato starch in an aqueous medium in the presence of polyethyleneimine at above or below the gelatinization temperature of the starch.

EP-A-0282761 discloses a process for producing paper, paperboard and cardboard by using a dry strength enhancer comprising a mixture obtainable by heating native potato starch with polyvinylamine in aqueous solution at 70 to 110° C.

EP-A-0301372 discloses a process for producing paper of high dry strength by using a dry strength enhancer comprising a mixture obtained by heating enzymatically degraded starch and cationic polymers such as polyvinylamines at up to 170° C.

U.S. Pat. No. 4,880,497 and U.S. Pat. No. 4,978,427 disclose the production of paper of high dry and wet strength by adding, either to the surface of the paper or to the paper stock prior to sheet formation, a hydrolyzed copolymer strength enhancer obtainable by polymerizing N-vinylformamide and ethylenically unsaturated monomers such as vinyl acetate or alkyl vinyl ethers and hydrolyzing from 30 to 100 mol % of the formyl groups of the copolymer to form the amino groups. WO-A-96/135525 [sic] discloses a process for the cationic modification of starch by reacting starch with polymers, diamino [sic] and/or ammonium groups contain [sic] in an aqueous medium at 115 to 180° C. under superatmospheric pressure with only minimal degradation of the starch.

WO-A-98/31711 discloses a process for modifying starch by, for example, reacting an anionic starch with a cationic polymer, for example polyvinylamine, at 80 to 220° C. in an aqueous medium. The aqueous solutions thus obtainable are used as dry and wet strength enhancers and also as drainage and retention aids for paper, paperboard and cardboard.

WO-A-98/45536 relates to a process for preparing paper, paperboard and cardboard of high dry strength by adding starches which are digested in an aqueous medium in the presence of cationic polymers. The paper stock is additionally admixed with a cationic polymer as retention aid for starch. The higher retention reduces the COD of the machine wastewater.

Yet, with all the processes mentioned above, where a cationic modified starch dry strength enhancer is added to paper stock, the sheet-forming step is accompanied by an unwelcome reduction in the drainage rate of the paper stock, which is particularly pronounced when comparatively high starch levels are used.

SUMMARY OF THE INVENTION

It is an object of the present invention to provide modified starch which, in the production of paper, paperboard and cardboard, combines an enhanced retention of starch in the paper with a drainage rate superior to that of existing cationic modified starches.

We have found that this object is achieved by a process for modifying starch by heating starch with at least one cationic polymer in an aqueous medium to temperatures above the gelatinization temperature of said starch, which comprises effecting said modifying of said starch in the presence of (a) a polymeric cationizer selected from the group consisting of the polymers containing vinylamine units and having molar masses of up to 1 million, the polyethyleneimines, the polydiallyldimethylammonium chlorides, the condensates of dimethylamine with epichlorohydrin or dichloroalkanes, the condensates of dichloroethane and ammonia, and the mixtures thereof, and (b) polymeric papermaking drainage aids selected from the group consisting of the water-soluble crosslinked polyamidoamines with or without an ethyleneimine graft, the nonionic or cationic polymers containing acrylamide and/or methacrylamide units and having molar masses of more than 1 million, the polymers containing vinylamine units and having molar masses of more than 1 million, and the mixtures thereof.

The present invention also provides the reaction products of starch with cationic polymers obtainable by the process described above.

DETAILED DESCRIPTION OF THE PREFERRED EMBODIMENTS

All starches can be modified according to the invention, for example native starches, oxidized native starches, starch ethers, starch esters, oxidized starch ethers, oxidized starch esters, cationic modified starches or amphoteric starches.

The native starches used may be starches from the group consisting of maize starch, potato starch, wheat starch, rice starch, tapioca starch, sago starch, sorghum starch, casaba starch, pea starch, or mixtures thereof. It is also possible to use starches which have an amylopectin content of at least 80% by weight. Such starches are obtainable for example by fractionation of customary native starches or by cultivation of such plants as produce virtually pure amylopectin starch, as described in Günther Tegge, Stärke und Stärkederivate, Hamburg, Behr's-Verlag 1984, pages 157–160. Starches having an amylopectin content of at least 80% by weight are commercially available. They are generally known as waxy maize starch, waxy potato starch or waxy wheat starch.

As well as native starches, it is also possible to use hydrolytically or enzymatically degraded starches, for example dextrins, such as white or yellow dextrins and multidextrins, or oxidized starches, for example dialdehyde starch. It is also possible to use chemically modified starches, for example starches esterified with inorganic or organic acids, especially phosphated and acetylated starches, and also starches etherified with organic halogen compounds, epoxides or sulfates. Starches and processes for their degradation and their chemical modification are described in Ullmann's Encyclopedia of Industrial Chemistry, 5$^{th}$ edition, vol. A25, pages 2 ff; which is hereby incorporated herein by reference.

The oxidation of starches is described in Ullmann's Encyclopedia of Industrial Chemistry, Sixth edition, 1998. Such oxidized starches can be prepared by various reactions. The oxidation converts OH or aldehyde functions, for example, into carboxylic acid functions. This oxidation may also be accompanied by $C_2$–$C_3$ bond breakage. Oxidized starches may be prepared using any of the native starches mentioned.

The anionic modification of starch is described in Günther Tegge, Stärke und Stärkederivate, Hamburg, Behr's-Verlag, 1984, pages 179 to 185. In general, anionic modification is a reaction of starch with α-halocarboxylic acids, preferably chloroacetic acid, or salts thereof or an esterification of starch with inorganic or organic acids as anionic modifier, preferably with dibasic or higher acids. Examples of acids useful as anionic modifiers are orthophosphoric acid, metaphosphoric acid, pyrophosphoric acid, polyphosphoric acids, phosphorous acid, sulfuric acid, pyrosulfuric acid, thiosulfuric acid, orthosilica, metasilica, pyrosilica, polysilicas, orthoboric acid, metaboric acid, polyboric acids, O-esters of dithiocarbonic acid (xanthic acids), oxalic acid, malonic acid, succinic acid, glutaric acid, adipic acid, phthalic acid, terephthalic acid, malic acid, citric acid, etc. and salts thereof. The degree of esterification of the resultant anionic modified starches is generally about 0.01–100 mol %, preferably 0.1–50 mol %, especially 0.2–20 mol %, based on the free hydroxyl groups in the starch modified. Polybasic acids may also be polyesterified. The process of the invention is preferably carried out using oxidized starches.

Particular preference is given to the use of dialdehyde starches, prepared by oxidation of native starch, and to anionic starches. The anionic starches preferably have carboxyl, phosphate or sulfate groups or respectively the alkali metal or ammonium salts thereof. Particularly preferably the anionic starch is carboxyl- and/or carboxylato-containing starch from potatoes, maize, wheat or tapioca. Starches whose use is particularly preferred are native potato starch, oxidized potato starch and oxidized maize starch. The oxidized starches contain carboxyl or carboxylate groups as anionic groups. The degree of substitution of the anionic starches is within the range from 0.0001 to 0.3, for example.

According to the invention, at least one starch or a mixture of a plurality of starches is heated in an aqueous medium in the presence of (a) at least one polymeric cationizer, and (b) at least one polymeric drainage aid for paper.

Examples of suitable polymeric cationizers are polymers containing vinylamine units and having molar masses of up to 1 million. Polymers of this kind are prepared according to known processes by polymerizing N-vinylcarboxamides of the formula

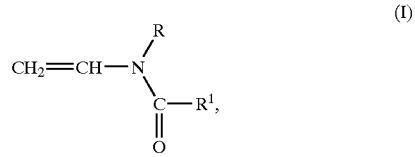

(I)

where R, R$^1$=H or $C_1$–$C_6$-alkyl, alone or in the presence of other, copolymerizable monomers and hydrolyzing the resulting polymers with acids or bases to detach the group

(II)

and form units of the formula

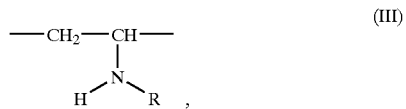

(III)

where R is as defined for the formula (I).

Examples of suitable monomers of the formula (I) are N-vinylformamide, N-vinyl-N-methylformamide, N-vinyl-N-ethylformamide, N-vinyl-N-propylformamide, N-vinyl-N-isopropylformamide, N-vinyl-N-butylformamide, N-vinyl-N-sec-butylformamide, N-vinyl-N-tert-butylformamide, N-vinyl-N-pentylformamide, N-vinylacetamide, N-vinyl-N-ethylacetamide and N-vinyl-N-methylpropionamide. Polymers containing polymerized units of the formula (III) are preferably prepared using N-vinylformamide.

The hydrolyzed polymers which contain units of the formula (III) have for example K values of from 15 to 150, preferably from 30 to 150, determined by the method of H. Fikentscher in aqueous solution at pH 7, 25° C. and a polymer concentration of 0.5% by weight. Copolymers of the monomers (I) contain for example 1) from 99 to 1 mol % of N-vinylcarboxamides of the formula (I), and
2) from 1 to 99 mol % of other, copolymerizable monoethylenically unsaturated monomers, for example vinyl esters of saturated carboxylic acids having from 1 to 6 carbon atoms, e.g., vinyl formate, vinyl acetate, vinyl propionate and vinyl butyrate. It is also possible to use unsaturated $C_3$–$C_6$-carboxylic acids, e.g., acrylic acid, methacrylic acid, maleic acid, crotonic acid, itaconic acid and vinylacetic acid, and also their alkali metal and alkaline earth metal salts, esters, amides and nitriles, for example methyl acrylate, methyl methacrylate, ethyl acrylate and ethyl methacrylate, or glycol or polyglycol esters of ethylenically unsaturated carboxylic acids where in each case only one OH group in the glycols and polyglycols has been esterified, e.g., hydroxyethyl acrylate, hydroxyethyl methacrylate, hydroxypropyl acrylate, hydroxybutyl acrylate, hydroxypropyl methacrylate, hydroxybutyl methacrylate, and also the acrylic monoesters of polyalkylene glycols having a molecular weight of from 1500 to 10,000. Also suitable are the esters of ethylenically unsaturated carboxylic acids with aminoalcohols, e.g., dimethylaminoethyl acrylate, dimethylaminoethyl methacrylate, diethylaminoethyl acrylate, diethylaminoethyl methacrylate, dimethylaminopropyl acrylate, dimethylaminopropyl methacrylate, diethylaminopropyl acrylate, diethylaminopropyl methacrylate, dimethylaminobutyl acrylate and diethylaminobutyl acrylate. The basic acrylates are used in the form of the free bases, the salts with mineral acids, for example hydrochloric acid, sulfuric acid and nitric acid, the salts with organic acids such as formic acid or benzenesulfonic acid, or in quaternized form. Examples of suitable quaternizing agents are dimethyl sulfate, diethyl sulfate, methyl chloride, ethyl chloride and benzyl chloride.

Useful comonomers 2) further include unsaturated amides such as, for example, acrylamide, methacrylamide and also N-alkylmonoamides and N-alkyldiamides containing alkyl radicals of from 1 to 6 carbon atoms, e.g., N-methylacrylamide, N,N-dimethylacrylamide, N-methylmethacrylamide, N-ethylacrylamide, N-propylacrylamide and tert-butylacrylamide and also basic (meth)acrylamides, e.g., dimethylaminoethylacrylamide, dimethylaminoethylmethacrylamide, diethylaminoethylacrylamide, diethylaminoethylmethacrylamide, dimethylaminopropylacrylamide, diethylaminopropylacrylamide, dimethylaminopropylmethacrylamide and diethylaminopropylmethacrylamide.

Suitable comonomers further include N-vinylpyrrolidone, N-vinylcaprolactam, acrylonitrile, methacrylonitrile, N-vinylimidazole and also substituted N-vinylimidazoles, e.g., N-vinyl-2-methylimidazole, N-vinyl-4-methylimidazole, N-vinyl-5-methylimidazole, N-vinyl-2-ethylimidazole, and N-vinylimidazolines, e.g., vinylimidazoline, N-vinyl-2-methylimidazoline, and N-vinyl-2-ethylimidazoline. N-Vinylimidazoles and N-vinylimidazolines are used not only in the form of the free bases but also after neutralization with mineral acids or organic acids or in quaternized form, preferred quaternizing agents being dimethyl sulfate, diethyl sulfate, methyl chloride and benzyl chloride.

Useful comonomers 2) further include sulfo-containing monomers such as vinylsulfonic acid, allylsulfonic acid, methallylsulfonic acid, styrenesulfonic acid and 3-sulfopropyl acrylate.

The copolymers further include terpolymers and such polymers as additionally contain at least one further monomer in polymerized form.

Preferred cationic polymers containing vinylamine units are hydrolyzed copolymers of 1) N-vinylformamide, and
2) vinyl formate, vinyl acetate, vinyl propionate, acrylonitrile and N-vinylpyrrolidone and also hydrolyzed homopolymers of N-vinylformamide having a degree of hydrolysis within the range from 2 to 100, preferably from 30 to 95, mol %.

Copolymers containing vinyl esters in copolymerized form may be hydrolyzed, depending on the hydrolysis conditions, not only at the N-vinylformamide units but also at the ester groups to form vinyl alcohol units. Copolymerized acrylonitrile is likewise chemically modified by the hydrolysis, forming amide, amidine and/or carboxyl groups, for example. The hydrolyzed poly-N-vinylformamides may optionally contain up to 20 mol % of amidine structures formed by reaction of formic acid with two adjacent amino groups in the polyvinylamine or by reaction of a formamide group with an adjacent amine group. The degree of hydrolysis of the N-vinylformamide units in the homo- and copolymers is preferably within the range from 75 to 100%. The molar mass of the polymers which contain vinylamine units and which are used as cationizers for starch is up to 1 million and is preferably within the range from 10,000 to 500,000 (determined by light scattering).

Useful cationic polymers further include compounds containing polymerized ethyleneimine units. These compounds are preferably polyethyleneimines obtainable by polymerizing ethyleneimine in the presence of acidic catalysts such as ammonium hydrogensulfate, hydrochloric acid or chlorinated hydrocarbons such as methyl chloride, ethylene dichloride, butyl chloride, carbon tetrachloride or chloroform. Such polyethyleneimines have a viscosity of from 500 to 33,000, preferably from 1000 to 31,000 mPaVs (measured according to Brookfield at 20° C. and 20 rpm), in 50% strength by weight aqueous solution, for example.

Useful cationizers for starch further include poly (diallyldimethylammonium chloride)s. Polymers of this kind are known. Diallyldimethylammonium chloride polymers contemplated are primarily homopolymers and also copolymers with acrylamide and/or methacrylamide. Any copolymerization may be carried out in any desired monomer ratio. The molar mass of the homo- or copolymers of diallyldimethylammonium chloride is not less than 50,000, preferably from 50,000 to 500,000 (determined by light scattering).

Useful cationizers for starch further include condensates of dimethylamine with epichlorohydrin or dichloroalkanes such as 1,2-dichloroethane, 1,2-dichloropropane, 1,3-dichloropropane, 1,4-dichlorobutane and/or 1,6-dichlorohexane, or condensates of 1,2-dichloroethane and ammonia. The condensates mentioned are soluble in water and have molar masses of up to 1 million, preferably from 50,000 to 500,000, for example.

Starch modification requires not only the above-described polymeric cationizers but also the polymeric papermaking drainage aids under group (b).

Examples of polymeric drainage aids are polyamidoamines with or without an ethyleneimine graft. Such polymers are described in U.S. Pat. No. 4,144,123, for example.

Polyamidoamines are prepared for example by reacting dicarboxylic acids of from 4 to 10 carbon atoms with polyalkylenepolyamines which preferably contain from 3 to 10 basic nitrogen atoms in the molecule. Examples of suitable dicarboxylic acids are succinic acid, maleic acid, adipic acid, glutaric acid, suberic acid, sebacic acid and terephthalic acid. It is also possible to use mixtures of adipic acid and glutaric acid or maleic acid and adipic acid. Polyamidoamines are preferably prepared using adipic acid.

Examples of suitable polyalkylenepolyamines which are condensed with the dicarboxylic acids are diethylenetriamine, triethylenetetramine, dipropylenetriamine, tripropylenetetramine, dihexamethylenetriamine, aminopropylethylenediamine and bisaminopropylethylenediamine. Polyalkylenepolyamines can also be used in the form of mixtures to prepare polyamidoamines. Polyamidoamines are preferably prepared by condensation of dicarboxylic acids and polyamines in the absence of a solvent. However, the condensation can also be carried out in inert solvents, if necessary. The condensation of dicarboxylic acids with polyalkylenepolyamines is customarily carried out at from 100 to 220° C., for example, and the water formed in the course of the reaction is distilled out of the reaction mixture. The condensation may also be carried out in the additional presence of lactones or lactams of carboxylic acids having from 4 to 8 carbon atoms, for example in the presence of caprolactam. From 0.8 to 1.4 mol of a polyalkylenepolyamine is used per mole of a dicarboxylic acid, for example. Polyamidoamines thus obtainable have primary and secondary NH groups, plus tertiary nitrogen atoms, in certain circumstances, and are soluble in water.

The above-described polyamidoamines can be modified by grafting with ethyleneimine by, for example, allowing ethyleneimine to act on the polyamidoamines in the presence of acids (e.g., sulfuric acid or phosphoric acid) or in the presence of Lewis acids (e.g., boron trifluoride etherates). For example, per basic nitrogen group in the polyamidoamine, from 1 to 50, preferably from 2 to 25, ethyleneimine units can be grafted on; i.e., about 10–500 parts by weight of ethyleneimine are used per 100 parts by weight of a polyamidoamine, for example.

Useful polymeric drainage aids further include reaction products which are preparable by grafting polyamidoamines with ethyleneimine and subsequent reaction with crosslinkers containing at least two functional groups. Products of this kind are identified in the hereinabove previously cited U.S. Pat. No. 4,144,123, for example, as useful retention, flocculation and drainage aids in papermaking.

Useful crosslinkers containing at least two functional groups include not only the polyalkylene glycol bischlorohydrin ethers described in U.S. Pat. No. 4,144,123, but also α,ω-dichloropolyalkylene glycols known as crosslinkers from EP-B-0 025 515, for example.

Useful crosslinkers for the reaction with optionally ethyleneimine-grafted polyamidoamines include for example α,ω- or vicinal dichloroalkanes, for example 1,2-dichloroethane, 1,2-dichloropropane, 1,3-dichloropropane, 1,4-dichlorobutane and 1,6-dichlorohexane. Examples of further crosslinkers are the reaction products of at least trihydric alcohols with epichlorohydrin to form reaction products which have at least two chlorohydrin units. Examples of polyhydric alcohols used are glycerol, ethoxylated or propoxylated glycerols, polyglycerols containing from 2 to 15 glycerol units in the molecule and also optionally ethoxylated and/or propoxylated polyglycerols. Crosslinkers of this kind are known from DE-A-2 916 356, for example. It is also possible to use crosslinkers which contain blocked isocyanate groups, e.g., trimethylhexamethylene diisocyanate blocked with 2,2,3,6-tetramethylpiperidin-4-one. Such crosslinkers are known, cf. for example DE-A-4 028 285, and also crosslinkers which contain aziridine units and are based on polyethers or substituted hydrocarbons, e.g., 1,6-bis-N-aziridinohexane, cf. U.S. Pat. No. 3,977,923. It will be appreciated that it is also possible to use mixtures of two or more crosslinkers to increase the molecular weight.

Preference is given to using halogen-free crosslinkers, for example di- or polyepoxides, ethylene carbonate and/or propylene carbonate. The reaction with the crosslinkers is conducted so as to obtain water-soluble products having a viscosity of from 50 to 5000, preferably from 100 to 2000, mPas at 20° C. in the form of a 10% strength by weight aqueous solution, for example.

Useful polymeric drainage aids further include nonionic or cationic polymers containing acrylamide and/or methacrylamide units and having molar masses of more than 1 million. Such high molecular weight polymers are customarily used as drainage and retention aids in papermaking. Preferred examples of polymers of this kind are high molecular weight polyacrylamides, high molecular weight polymethacrylamides and also the copolymers of acrylamide and methacrylamide with copolymerizable monomers. Examples of suitable drainage aids are copolymers of 60–85% by weight of acrylamide and/or methacrylamide and 15–40% by weight of N-vinylimidazoline or N-vinyl-2-methylimidazoline. The copolymers may further be modified by incorporation of polymerized units from other monomers such as styrene, N-vinylformamide, vinyl formate, vinyl acetate, vinyl propionate, $C_1$–$C_4$-alkyl vinyl ethers, N-vinylpyridine, N-vinylpyrrolidone, N-vinylimidazole, ethylenically unsaturated $C_3$–$C_5$-carboxylic acids and also their esters, amides and nitriles, sodium vinylsulfonate, 2-acrylamidomethylpropanesulfonic acid, vinyl chloride and vinylidene chloride in amounts of up to 25% by weight. Monomers which contain acid groups are preferably used in the form of the alkali metal or ammonium salts in the copolymerization. Examples of useful drainage aids are copolymers containing 1) from 70 to 97% by weight of acrylamide and/or methacrylamide,
2) from 2 to 20% by weight of N-vinylimidazoline or N-vinyl-2-methylimidazoline, salts of these monomers and/or alkylator-quaternized N-vinylimidazoline or N-vinyl-2-methylimidazoline, and
3) from 1 to 10% by weight of N-vinylimidazole in copolymerized form. These copolymers are prepared by free radical copolymerization of said monomers 1), 2) and 3) according to known polymerization processes. They have molar masses of >1 million, preferably of from 1.2 to 30 million.

Useful high molecular weight cationic polymers further include copolymers of 1–99 mol %, preferably 30–70 mol %, of acrylamide and/or methacrylamide and 99–1 mol %, preferably 70–30 mol %, of dialkylaminoalkyl acrylates and/or methacrylates, for example copolymers of acrylamide and N,N-dimethylaminoethyl acrylate or N,N-diethylaminoethyl acrylate. Basic acrylates are preferably present in acid-neutralized or in quaternized form. Quaternization may be effected for example with methyl chloride or with dimethyl sulfate. These copolymers have a charge density of at least 4 meq/g of polyelectrolyte at a pH of 4.5, for example.

Useful drainage aids also include high molecular weight copolymers of from 1 to 99 mol %, preferably of from 30 to 70 mol %, of acrylamide and/or methacrylamide and of from 99 to 1 mol %, preferably of from 70 to 30 mol %, of dialkylaminoalkylacrylamide and/or dialkylaminoalkylmethacrylamide. Basic acrylamides and methacrylamides are preferably likewise present in acid-neutralized or in quaternized form. Specific examples are N-trimethylammoniumethylacrylamide chloride, N-trimethylammoniumethylmethacrylamide chloride, trimethylammoniumethylacrylamide methosulfate, trimethylammoniumethylmethacrylamide methosulfate, N-ethyldimethylammoniumethylacrylamide ethosulfate, N-ethyldimethylammoniumethylmethacrylamide ethosulfate, trimethylammoniumpropylacrylamide chloride, trimethylammoniumpropylmethacrylamide chloride, trimethylammoniumpropylacrylamide methosulfate, trimethylammoniumpropylmethacrylamide methosulfate and N-ethyldimethylammoniumpropylacrylamide ethosulfate. Trimethylammoniumpropylmethacrylamide chloride is preferred. The molar mass of these polymers is likewise above 1 million.

Useful high molecular weight polymeric drainage aids further include polymers containing vinylamine units and having molar masses of more than 1 million. These polymers may have the same percentage composition as the vinylamine polymer cationizers mentioned under (a). The difference is the higher molecular weight of polymers (b). Examples of preferred high molecular weight polymers containing vinylamine units are high molecular weight hydrolyzed poly-N-vinylformamides having a degree of hydrolysis of from 20 to 100%, preferably of from 75 to 100%. Preferred vinylamine polymers further include hydrolyzed copolymers of N-vinylformamide and vinyl formate, vinyl acetate, vinyl propionate, acrylonitrile or N-vinylpyrrolidone. The degree of hydrolysis of these polymers is for example within the range from 2 to 100 mol %, preferably within the range from 30 to 95 mol %. The molar mass of this group of polymers with [sic] likewise above 1 million, for example within the range from 1.2 to 30 million, preferably within the range from 1.5 million to 15 million.

To modify a starch or a mixture of starches according to the present invention, for example, an aqueous suspension of at least one starch variety is heated with a cationic polymeric cationizer of group (a) and a polymeric papermaking drainage aid of group (b) at temperatures above the gelatinization temperature of starch. The initial result of heating aqueous starch suspensions in the presence of polymers of groups (a) and (b) is the digestion of the starch, i.e., the conversion of the solid starch grains into a water-soluble form, with disappearance of superstructures (helix formation, intramolecular hydrogen bonds, etc.), without the amylose and/or amylopectin units which make up the starch being degraded to oligosaccharides or glucose. The aqueous starch suspensions are preferably heated in the presence of at least one polymeric cationizer (a) and at least one polymeric papermaking drainage aid (b) to temperatures above the gelatinization temperature of starch. These temperatures are for example within the range from 80 to 180° C., preferably within the range from 105 to 170° C. When temperatures of from 105 to 170° C. are employed, the starch is heated under superatmospheric pressure. In the course of being heated in aqueous suspension, the starch is digested to an extent of not less than 90%, preferably more than 90%, by weight and modified by the two different types of polymers. Preferably said conversion of the starch is effected with the polymers a) and b) under superatmospheric pressure in a jet cooker at from 115 to 150° C. in the course of from 0.01 sec to 30 minutes. In the course of the reaction in a jet cooker, the reaction mixture is subjected to shearing. However, if the reaction is carried out in a stirred autoclave, the reaction mixture is stirred at from 100 to 2000 rpm, preferably at from 200 to 1000 rpm, for example. The reaction can be carried out in virtually any apparatus which are employed in industry for starch digestion, and is preferably carried out in pressure tight stirred tanks or preferably in jet cookers. When the reaction is carried out in a stirred autoclave, the residence time of the reaction mixture at the reaction temperatures contemplated is for example within the range from 2 min to 2 hours, preferably within the range from 15 to 60 min.

Starch may also be modified, however, by first heating an aqueous suspension of the starch to temperatures above the gelatinization temperature of starch to digest the starch, then—likewise at temperatures above the gelatinization temperature of starch—adding the polymeric cationizers (a) allowing them to react, and thereafter adding the polymeric papermaking drainage aid (b), allowing the resultant reaction mixture to react for from 1 sec to 30 min, for example, at temperatures above the gelatinization temperature of starch, and thereafter cooling down the reaction mixture. However, it is also possible to treat a previously digested starch in aqueous solution initially with a polymeric drainage aid (b) at temperatures above the gelatinization temperature of starch (for example from 1 sec to 1 h) and then adding a polymeric cationizer (a) and allowing the reaction mixture to react at temperatures above the gelatinization temperature of starch, again for from 1 sec to 1 h. In the preferred procedure, however, an aqueous suspension of starch is simultaneously digested and modified by heating it in a jet cooker at from 115 to 150° C. for from 0.01 sec to 30 min in the presence of polymers (a) and (b). Said polymers (a) and (b) may be added to the starch suspension in the form of a mixture or separately. It is similarly possible to meter polymers (a) and (b) in succession into the reaction zone of the jet cooker.

The concentration of starch in the aqueous starch suspension is for example within the range from 2 to 15% by weight, preferably within the range from 6 to 10% by weight. Per 100 parts by weight of the starch used as starch to be modified, the amount of polymeric cationizer (a) used is for example within the range from 0.1 to 10 parts by weight, preferably within the range from 0.5 to 3 parts by weight, and that of the polymeric drainage aid (b) within the range from 0.01 to 2 parts by weight, preferably within the range from 0.1 to 0.9 part by weight. The aqueous modified starch solutions obtained have a viscosity of from 10 to 500, preferably of from 50 to 200, mPas, measured in a Brookfield viscometer at 20 rpm and 40° C., at a solids concentration of 2% by weight, for example. The pH of the reaction mixtures is for example within the range from 2.0 to 9.0, preferably from 2.5 to 8.

The modified starches thus obtainable are used as paper, paperboard and cardboard dry strength enhancers. They are added to the paper stock in amounts of from 0.5 to 8.0%, preferably of from 1.0 to 6.0%, by weight, based on dry paper stock, for example. The otherwise customary process chemicals for papermaking may be additionally employed, for example a sizing agent or else a retention aid in addition to the dry strength enhancers. Examples of useful retention aids are high molecular weight polyacrylamides or high molecular weight poly-N-vinylformamides having a degree of hydrolysis of from 25 to 100%. The molar masses of retention aids are customarily above 1 million, for example within the range from 1.5 to 30 million.

Useful retention aids for the starch modified according to the invention further include so-called microparticulate systems under which a high molecular weight cationic synthetic polymer is added to the paper stock, the macroflocs are divided by shearing the paper stock and then bentonite is added. This process is known from EP-A-0 335 575, for example. For such a microparticulate system it is possible, for example to use, as the high molecular weight cationic polymers having molar masses of >1 million, a mixture of a vinylamine polymer, for example polyvinylamine, and a cationic polyacrylamide, for example a copolymer of acrylamide and dimethylaminoethyl acrylate methochloride and to add bentonite after the shearing step. Further preferred combinations of cationic polymers useful as retention aids for starches modified according to the invention are mixtures of vinylamine polymers having molar masses of >1 million and ethyleneimine-grafted crosslinked polyamidoamines and also mixtures of said high molecular weight vinylamine polymers with polyacrylamides having molar masses of from 2 million to 15 million.

Unless otherwise stated, percentages in the Examples are by weight. The K values were determined according to H. Fikentscher, Cellulose-Chemie 13 (1932), 58–64, 71–74, in aqueous solution at a polymer concentration of 0.5% by weight and at 25° C. The molar masses of the polymers were determined by light scattering. The viscosities were measured in a Brookfield viscometer at 20 rpm.

EXAMPLES

The following materials were used:

Cationizer I

Hydrolyzed poly-N-vinylformamide which contained 95 mol % of vinylamine units and 5 mol % of vinylformamide units and had a molar mass of 120,000 g/mol and a viscosity of 600 mPas in 7.8% strength by weight aqueous solution at 20° C. and pH 7.0. The vinylamine polymer was prepared by hydrolyzing a K 70 N-vinylformamide polymer using aqueous sodium hydroxide solution.

Drainage Aid I

Commercially available ethyleneimine-grafted water-soluble polyamidoamine formed from adipic acid and a triamine and crosslinked with a bischlorohydrin ether (Polymin® SK).

Starch I

Oxidized maize starch having carboxyl groups as anionic groups. The degree of substitution of this starch is 0.8 mmol/mol (=$0.8 \times 10^{-3}$).

Inventive Example 1

A 10% strength aqueous suspension of starch I was produced, 1.5%, based on starch, of cationizer I and 0.4% of drainage aid I were added, and the mixture was fed into a jet cooker. It was maintained therein at 130° C. for 1 min and then discharged, affording an aqueous solution of a modified anionic maize starch.

Comparative Example 1

A 10% strength aqueous slurry of starch I was admixed with 1.5%, based on starch I, of cationizer I. The mixture was then cooked in a jet cooker at 130° C. for 1 min, affording an aqueous solution of a starch I modified by cationizer I.

Inventive Example 2

An experimental papermachine was used to produce paper having a basis weight of 120 g/m² at a production speed of 50 m/min. The fiber used was beaten commercially available liner having a concentration of 12 g/l and a pH of 7.0. This stock was admixed, in each case based on dry paper stock, with 2% of the modified starch prepared according to inventive example 1 and as retention aid with a combination of 0.04% of drainage aid I and 0.001% of a commercially available polyacrylamide having a molar mass of 5 million. After the paper web formed had passed through the press end of the paper machine, samples were taken to determine the moisture content of the paper. The dry content of the paper was 66.4%.

Also determined were the dry bursting pressure (according to DIN ISO 2758), the flat crush resistance (CMT value according to DIN EN 23035=ISO 3035) and the dry breaking length (according to DIN ISO 1924). The dry bursting pressure was found to be 223 Pa, the CMT value 227 N and the dry breaking length 5545 m.

Inventive Example 3

Inventive example 2 was repeated with the one difference that 6% of the starch modified according to inventive example 1 was added to the paper stock, based on solids. After passing through the press end of the paper machine, the dry content of the paper was 62.7%. The finished paper had a dry bursting pressure of 293 Pa, a CMT value of 268 N and a dry breaking length of 6371 m.

Comparative Example 2

Inventive example 2 was repeated with the one difference that the modified starch used was replaced by the modified starch obtained according to comparative example 1. After passing through the press end, the paper had a dry content of 51.8%. The finished paper had a dry bursting pressure of 205 mPa, a CMT value of 199 N and a dry breaking length of 5261 m.

Comparative Example 3

Inventive example 3 is repeated with the one difference that the modified starch obtained according to comparative example 1 is used. The papermaking process had to be discontinued at the predetermined papermachine speed, since the fiber did not drain sufficiently rapidly.

As inventive examples 2 and 3 show, a higher use level of starch is possible compared with comparative examples 2 and 3, and the invention provides better drainage of the paper stock (higher dry content of the paper downstream of press end of papermachine) and a high level for the strength values of the paper.

We claim:

1. A process for modifying starch, comprising:
   heating starch with at least one cationic polymer in an aqueous medium to temperatures above the gelatinization temperature of said starch, wherein the starch is selected from the group consisting of the native starches, the oxidized native starches, the starch ethers, the starch esters, the oxidized starch ethers, the oxidized starch esters, the cationic modified starches and the amphoteric starches and effecting said modifying of said starch in the presence of a combination of
   (a) a polymeric cationizer selected from the group consisting of polymers containing vinylamine units and having molecular weights Mw of up to 1 million, polyethyleneimines, polydiallyldimethylammonium chlorides, condensates of dimethylamine with epichlorohydrin or dichloroalkanes, condensates of dichloroethane and ammonia, and mixtures thereof; and (b) a polymeric papermaking drainage aid selected from the group consisting of a water-soluble crosslinked polyamidoamine with or without an ethyleneimine graft, a polymer containing acrylamide and/or methacrylamide units and having a molecular weight Mw of more than 1 million, a polymer containing vinylamine units and having a molecular weight Mw of more than 1 million, and mixtures thereof.

2. The process as claimed in claim 1, wherein
(a) said polymeric cationizer is selected from the group consisting of polyethyleneimines, polymers containing vinylamine units and having molecular weights Mw of up to 1 million, and
(b) said polymeric drainage aid is selected from the group consisting of a water-soluble, ethyleneimine-grafted crosslinked polyamidoamine, a polymer containing vinylamine units and having a molecular weight Mw ranging from 1.2 to 30 million, and a cationic polyacrylamide or nonionic polyacrylamide each having a molecular weight Mw of not less than 1.5 million.

3. The process as claimed in claim 1, wherein said starch is a native starch.

4. The process as claimed in claim 1, wherein said starch is selected from the group consisting of the starch ethers, the starch esters, the oxidized native starch, the oxidized starch ethers and the oxidized starch esters.

5. The process as claimed in claim 1, wherein said starch, prior to modification is an anionic starch.

6. The process as claimed in claim 1, wherein said starch is an anionic starch that contains carboxyl and/or carboxylato, phosphate or sulfate groups or the respective alkali metal or ammonium salts thereof.

7. The process as claimed in claim 6, wherein said anionic starch that is a carboxyl- and/or carboxylato-containing starch is obtained from potatoes, maize, wheat or tapioca.

8. The process as claimed in claim 1, wherein said starch is heated in said aqueous medium to 115–170° C. under superatmospheric pressure.

9. The process as claimed in claim 1, wherein said heating of said starch is effected with at least one polymeric cationizer and at least one polymeric drainage aid in a jet cooker at a temperature ranging from 120 to 150° C. in the course of from 0.01 sec to 30 minutes.

10. The process as claimed in claim 1, wherein, based on 100 parts by weight of starch, from 0.1 to 10 parts by weight of at least one polymeric cationizer (a) is combined with from 0.01 to 2 parts by weight of at least one drainage aid (b) for the modification of said starch.

11. A reaction product of starch with a cationic polymer prepared by the process of claim 1.

12. A paper, paperboard or cardboard product, comprising:
a paper, paperboard or cardboard modified with from 0.5 to 8.0% by weight of the reaction product of claim 11.

13. A process for producing paper, paperboard or cardboard, comprising:
adding a dry strength enhancer prepared by the process of claim 1 to a paper stock; and
draining said treated paper stock onto a sieve which results in the formation of a sheet on the sieve, thereby forming a paper, paperboard or cardboard of improved dry strength.

14. The process as claimed in claim 1, wherein said drainage aid is a copolymer prepared by reacting:
i) from 70 to 97% by weight of acrylamide and/or methacrylamide,
ii) from 2 to 20% by weight of N-vinylimidazoline or N-vinyl-2-methylimidazoline, salts of these monomers and/or alkylator-quaternized N-vinylimidazoline or N-vinyl-2-methylimidazoline, and
iii) from 1 to 10% by weight of N-vinylimidazole.

15. The process as claimed in claim 1, wherein said drainage aid is a copolymer prepared by reacting:
i) from 1 to 99 mol % of (meth)acrylamide with
ii) from 99 to 1 mol % of a dialkylaminoalkyl(meth) acrylamide.

16. The process as claimed in claim 1, wherein the pH of the starch modification reactions ranges from 2.0 to 9.0.

17. The process as claimed in claim 1, wherein said polyamidoamine drainage aid has from 1 to 50 ethyleneinine units grafted thereon per basic nitrogen atom of the polyamidoamine.

* * * * *